(12) United States Patent
Boichot et al.

(10) Patent No.: US 6,279,486 B1
(45) Date of Patent: Aug. 28, 2001

(54) DEVICE FOR DAMPING THE TRANSVERSE AND HUNTING MOVEMENTS OF A VEHICLE, AND VEHICLE PROVIDED WITH SUCH A DEVICE

(75) Inventors: Philippe Boichot, Le Creusot; Fabienne Bondon, Couches, both of (FR)

(73) Assignee: Alstom Holdings, Paris (FR)

( * ) Notice: Subject to any disclaimer, the term of this patent is extended or adjusted under 35 U.S.C. 154(b) by 0 days.

(21) Appl. No.: 09/413,375

(22) Filed: Oct. 6, 1999

(30) Foreign Application Priority Data

Oct. 7, 1998 (FR) .................................................. 98 12574

(51) Int. Cl.[7] ...................................................... B61F 3/00
(52) U.S. Cl. ........................................ 105/194; 105/198.3
(58) Field of Search .................................... 105/167, 171, 105/194, 198.3, 198.2

(56) References Cited

U.S. PATENT DOCUMENTS 3,376,831 * 4/1968 Eaton et al. .......................... 105/167
5,662,046 * 9/1997 Wright et al. ........................ 105/167

FOREIGN PATENT DOCUMENTS 615890   9/1994 (EP) .
742277  12/1996 (EP) .

* cited by examiner

Primary Examiner—S. Joseph Morano
Assistant Examiner—Robert J. McCarry, Jr.
(74) Attorney, Agent, or Firm—Sughrue, Mion, Zinn, Macpeak & Seas, PLLC

(57) ABSTRACT

This damping device comprises:
- two symmetrical jacks (10, 10'), extending respectively between each support member (8, 6) and the housing (4), each jack (10, 10') defining two chambers (24, 24', 26, 26') filled with a hydraulic fluid (16, 16'),
- two hydraulic lines (28, 28') establishing fluid communication between, on the one hand, the first chambers (24, 24') of the jacks and, on the other hand, the second chambers (26, 26') of the jacks, two branch lines (30, 30') opening into two accumulators (32, 32') containing a compressed gas,
- and means (34, 36, 40, 42) capable of providing a controlled flow rate of the fluid outside the said chambers (24, 24', 26, 26') and means (38, 44) capable of providing a controlled flow rate of the fluid to the accumulators.

The intensity of damping of the transverse and hunting components can be independently adjusted.

9 Claims, 4 Drawing Sheets

DEVICE FOR DAMPING THE TRANSVERSE AND HUNTING MOVEMENTS OF A VEHICLE, AND VEHICLE PROVIDED WITH SUCH A DEVICE

BACKGROUND OF THE INVENTION

The present invention relates to a device for damping the transverse and hunting movements of a vehicle.

The invention relates to any vehicle, in particular a road or rail vehicle, provided with a housing resting on two members disposed longitudinally at a distance from one another and free to move transversely relative to this housing. For the purposes of the invention, the terms longitudinal and transverse are to be assessed relative to the movement of the vehicle.

In the railway sector, such a vehicle comprises, for example, a car resting on two bogies, respectively front and rear bogies. During movements of this car, the housing possesses a degree of transverse deflection relative to the bogies and is additionally subjected to an angular movement known as hunting. The latter is due to the pivoting of the whole of the housing about a vertical axis, which lies between the front and rear bogies, substantially in the medium longitudinal axis of the vehicle. These movements, whether transverse or hunting, are a source of discomfort or may threaten to jeopardize the safety of the equipment. It is therefore necessary to fit the vehicle with a permanent device for damping such movements.

FR-A-2,252,228 has disclosed a device for damping the transverse movements of the housing relative to the bogies. This device comprises two jacks assigned to one of the bogies, each of these jacks defining two chambers whose respective volumes vary as a function of the relative transverse movement between the bogie and the housing. These chambers are connected in pairs by means of hydraulic lines in which are fitted valves for controlling the fluid flow.

This solution, however, has a disadvantage in that it is necessary to fit two devices as described above, to to the front and rear bogies of the vehicle, respectively. No coupling between the front and rear is utilized, which makes it impossible to optimize the damping of the hunting movement of the housing.

SUMMARY OF THE INVENTION

In order to remedy the disadvantages of the prior art mentioned above, the invention proposes to provide a device which ensures reliable damping of both transverse movements and hunting movements of the housing and enables an operator to adjust these two damping components independently of one another.

To this end, the invention relates to a damping device intended to be mounted on a vehicle, in particular a rail vehicle, comprising a housing resting on first and second support members, in particular bogies, arranged longitudinally at a distance apart from one another, the housing being capable of displacement relative to the support members in accordance with two types of movement, specifically a transverse movement and a pivoting movement about a point situated substantially on a medium longitudinal axis of the vehicle and between the said support members, characterized in that the said device comprises:

the first and second symmetrical jacks, extending respectively between each support member and the housing, each jack defining the first and second chambers filled with a hydraulic fluid capable of being, respectively, compressed and let down during variations in the transverse distance between the housing and the support member in question, first and second hydraulic lines establishing fluid communication between, on the one hand, the first chambers of the first and second jack and, on the other hand, the second chambers of the first and second jacks, the said first and second lines respectively possessing the first and second intermediate points from which extend first and second branch lines opening, opposite the intermediate points, into first and second accumulators containing a compressed gas, first to fourth means for controlling the flow of the hydraulic fluid, arranged between each of the chambers and one of the intermediate points capable of providing a controlled flow rate of the fluid from the said chambers to the intermediate points, fifth and sixth means for controlling the flow of the hydraulic fluid, arranged between each of the intermediate points and the corresponding accumulator capable of providing a controlled flow rate of the fluid from the intermediate points to the accumulators, the chambers between which communication is established by each of the two lines being respectively let down and compressed during a first type of movement between the support members and the housing, so that substantially all of the fluid driven from each compressed chamber penetrates into the let-down chamber with which it communicates, generally without any variation in the volume of fluid in the accumulators, and the chambers communicating via one of the lines both being compressed during a second type of movement between the support members and the housing, so as to direct the fluid driven from these two compressed chambers to one of the accumulators and to increase the pressure of the gas contained therein, while the chambers communicating via the other line are both let down, so as to direct to these two let-down chambers part of the fluid present in the other accumulator and to reduce the pressure of the gas contained therein.

According to other features of the invention:

the first to fourth means for controlling the flow of the fluid are capable of providing a free flow of the fluid from the intermediate points to the said chambers;

the fifth and sixth means for controlling the flow of the fluid are capable of providing a free flow of the fluid from the accumulators to the intermediate points;

the means for controlling the flow of the fluid comprise a non-return valve mounted in parallel with a valve;

each of the jacks comprises a seating solidly fixed to the housing or to one of the support members, in which seating a piston whose rod is solidly fixed to one of the members or to the housing is able to move, the rod extending longitudinally over the entirety of the seating;

a first jack extends from a first transverse end of the housing, while the other jack extends from the transverse end of the housing opposite to the first end.

The invention likewise relates to a vehicle, in particular a rail vehicle, comprising a housing resting on two support members, in particular two bogies, disposed longitudinally at a distance from one another, characterized in that this vehicle is equipped with a damping device as described above.

BRIEF DESCRIPTION OF DRAWINGS

The invention will be described below with reference to the attached drawings, given solely by way of non-limiting example, in which.

DETAILED DESCRIPTION OF THE INVENTION

Figure 1:
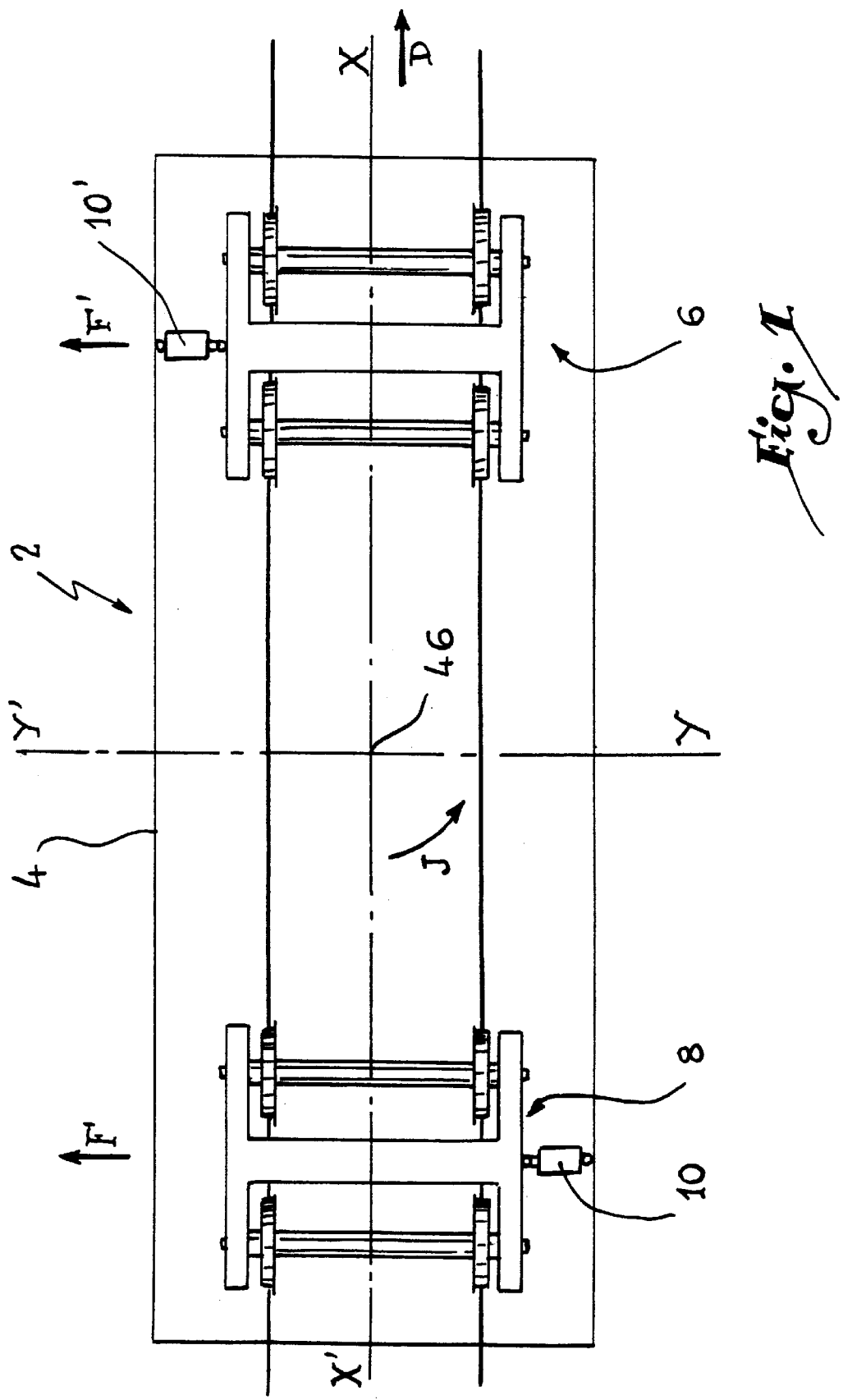
FIG. 1 is a diagrammatic plan view of a vehicle equipped with a damping device according to the invention.

FIG. 1 illustrates diagrammatically a vehicle provided with a damping device according to the invention. Such a vehicle, designated as a whole by the reference 2, is by way of non-limiting example a railway car. It comprises a housing 4 resting on first and second bogies 6 and 8. This car 2 is intended to move in the direction of the arrow D. The medium longitudinal axis of this housing is designated X'X, whereas its medium transverse axis is called Y'Y.

During its movements, the housing 4 may be subject to transverse movements relative to the bogies 6 and 8, represented by the arrows F and F'. The housing may also pivot relative to the bogies about a point 46, or hunting axis, disposed substantially at the intersection of the axes X'X and Y'Y, which is represented by the arrow J.

All these movements are damped by a damping device according to the invention, of which only two jacks 10, 10' are shown in this FIG. 1.

Figure 2:
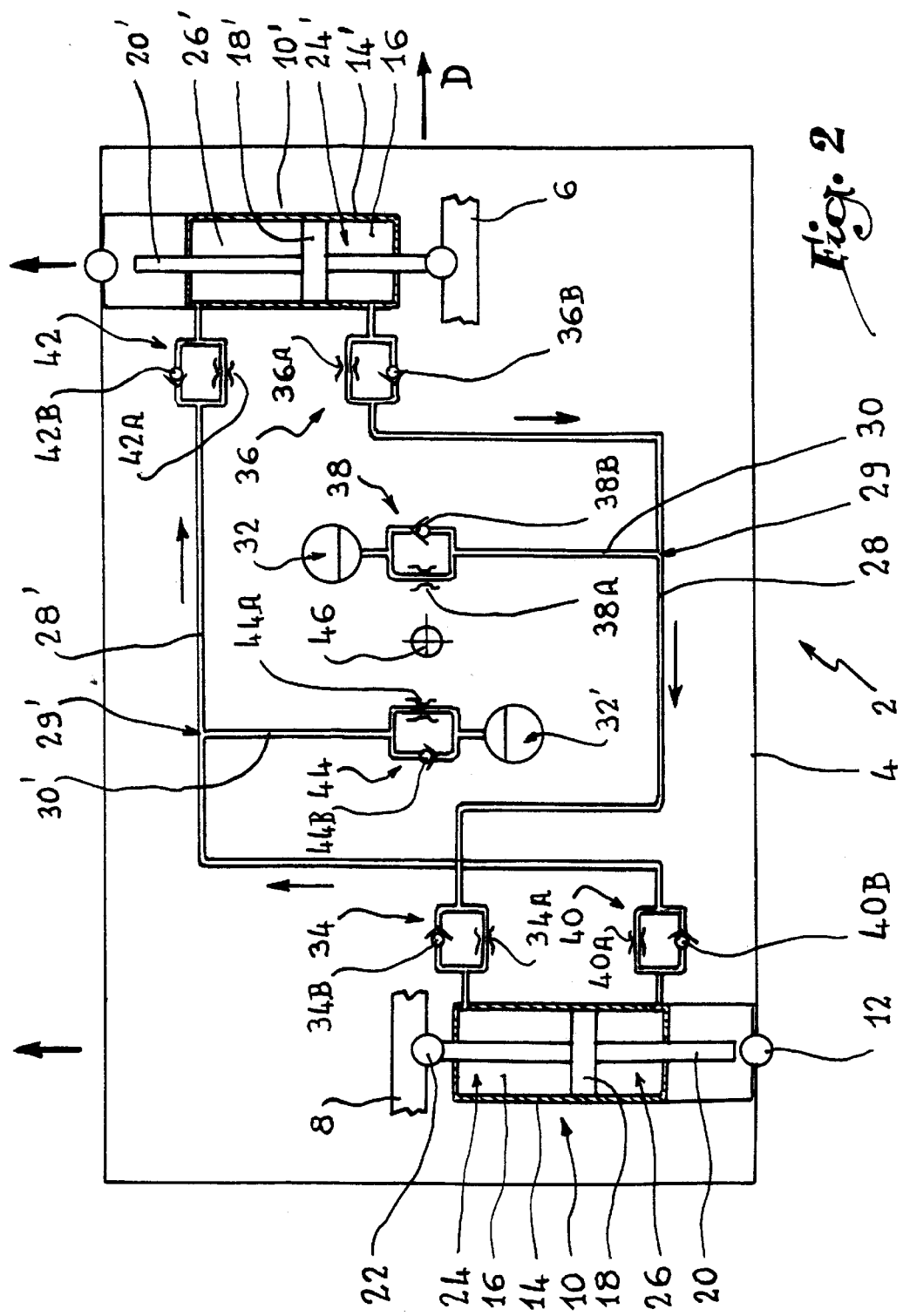
FIG. 2 is a view on a larger scale of the vehicle according to FIG. 1, showing in detail the damping device in its position of rest.

This damping device is illustrated in detail in FIG. 2, in which only one of the transverse ends of each of the bogies 6, 8 is diagrammatically shown.

The damping device according to the invention comprises a first jack 10 whose body 11 is fixed, by a ball joint 12, at the level of a transverse end of the housing 4. The body 11 defines a seating 14 which is substantially closed and filled with a fluid 16, for example hydraulic oil. A piston 18 is arranged in the seating 14, being free to slide longitudinally relative thereto. This piston 18 is associated by its rod 20 with the transverse end of the rear bogie 8, in the vicinity of the end of the housing receiving the jack 10. The connection between the rod 20 and the bogie 8 is provided by an additional ball joint 22.

The piston 18 defines, within the seating 14, two chambers referred to respectively as proximal 24 and distal 26, reference being made to the rear bogie 8. During the deflecting movements between the facing transverse ends of the housing 4 and the rear bogie 8, the piston 18 is therefore free to move longitudinally within the seating 14, so as to cause a change in the respective volumes of the chambers 24 and 26. It should be noted that the jack 10 is symmetrical, in that the thrust section of the piston is identical in the chambers 24 and 26, because the rod 20 extends longitudinally over the whole of the seating 14 and passes through the two end walls thereof.

The damping device according to the invention likewise comprises a second jack 10' extending between the housing 4 and the front bogie 6. This jack 10' is fixed to the transverse end of the housing, opposite that accommodating the jack 10.

The jack 10' possesses a structure similar to that of the jack 10, and its body 11', fixed to the housing 4, defines a seating 14' accommodating hydraulic fluid 16, in which can slide a piston 18' fixed by its rod 20' to the front bogie 6. The piston 18' thus defines proximal 24' and distal 26' chambers, reference being made to the front bogie 6, whose respective volumes are able to vary as a function of the movements of the piston 18', that is to say during their transverse deflections between the housing 4 and the front bogie 6.

The jacks 10 and 10' are associated with the housing 4 at the level of the opposite transverse ends of the latter.

The two proximal chambers 24, 24' of the two jacks 10, 10' are in mutual fluid communication via a line 28, from an intermediate point 29 from which a secondary line 30 extends which opens into an oleopneumatic accumulator 32. The latter is formed by a seating containing a compressed inert gas capable of receiving the hydraulic fluid via the line 30. The pressure of the gas within the accumulator is a function of the quantity of fluid present therein. In a known manner, the inert gas and the fluid are generally physically separated by a membrane or a bladder.

Means for controlling the flow of the fluid are interposed between the chamber 24 of the jack 10 and the intermediate point 29. These control means, designated as a whole by the reference 34, comprise a valve 34A mounted in parallel with a non-return valve 34B. It should be noted that the arrangement of the non-return valve is such that it allows a free flow of the fluid from the intermediate point 29 to the chamber 24 and a flow controlled by adjustment of the valve 34A in the opposite direction.

Means 36 for controlling the flow of the fluid are likewise provided between the chamber 24' and the intermediate point 29. These means comprise a valve 36A mounted in parallel with a non-return valve 36B, which allows a free flow of the fluid from the point 29 to the chamber 24' and a controlled flow in the opposite direction, by adjustment of the valve 36A.

Means 38 are likewise provided enabling the flow of the fluid between the intermediate point 29 and the accumulator 32 to be controlled. To this end, a valve 38A is mounted in parallel with a non-return valve 38B, allowing the free flow of the fluid from the accumulator 32 to the intermediate point 29, and a controlled flow in the opposite direction, by adjustment of the valve 38A.

The distal chambers 26 and 26' are placed in fluid communication by the agency of a line 28', from an intermediate point 29' on which there extends a secondary line 30', which opens into an accumulator 32' similar to the accumulator 32.

Means 40 enable the flow of the fluid between the chamber 26 and the intermediate point 29' to be controlled. These means comprise a valve 40A mounted in parallel with a non-return valve 40B allowing the free flow of the fluid from the intermediate point 29' to the chamber 26 and providing a controlled flow in the opposite direction by adjustment of the valve 40A.

Means 42 intended for the control of the flow of the fluid are likewise interposed between the chamber 26' and the intermediate point 29'. These means comprise a valve 42A mounted in parallel with a non-return valve 42B allowing the free flow of the fluid from the intermediate point 29' to the chamber 26' and controlling the flow of this fluid in the other direction by adjustment of the valve 42A.

Finally, the flow of the fluid towards the intermediate point 29' and the accumulator 32' is controlled by the agency of means 44, which comprise a valve 44A mounted in parallel with a non-return valve 44I. The latter allows free circulation of the fluid from the accumulator 32' to the intermediate point 29' and controls the flow rate of this fluid in the other direction, as a function of the adjustment of the valve 44A.

Figure 3:
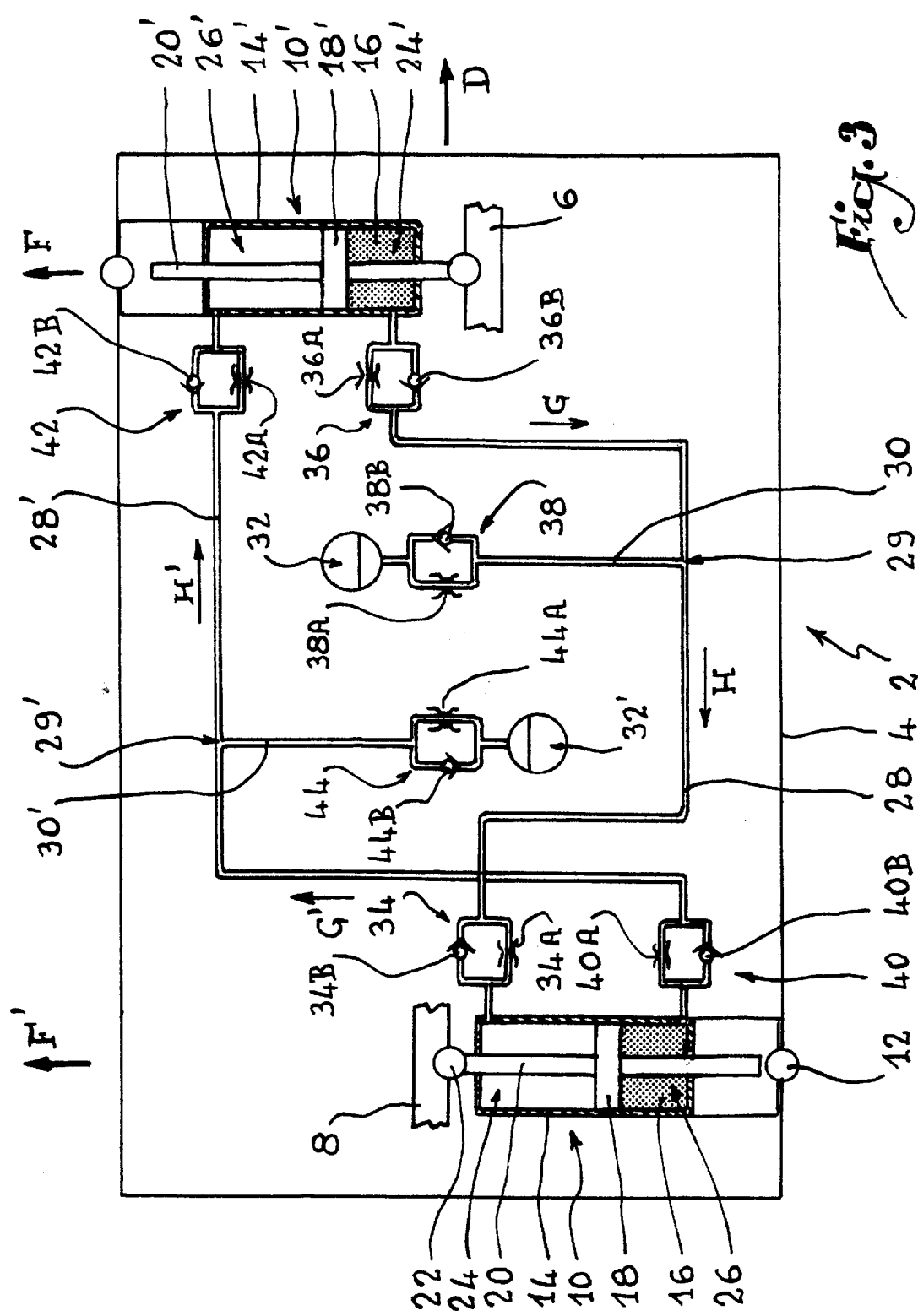
FIG. 3 is a view similar to FIG. 1, showing the device according to FIG. 1 in its position for damping the transverse movements of the housing of the vehicle.

A description will now be given, with reference to FIG. 3, of the functioning of the damping device according to the invention during transverse movements of the housing 4 relative to the bogies 6 and 8.

During such transverse movement, the housing 4 moves relative to the front bogie 6 and rear bogie 8 in the direction of the arrows F and F' pointing in the same direction. The piston 18 thus tends to move closer to the longitudinal end of the seating 14 nearer to the balljoint 12, so that the chamber 26 is compressed while the chamber 24 is let down. Reference to a compressed or let-down chamber means a chamber within which the hydraulic fluid is compressed or let down. The compressed state is indicated in bold in the drawings.

Similarly, the piston 18' moves closer to the longitudinal end of the seating 14' close to the front bogie 6, so that the chamber 24' is compressed whereas the chamber 26' is let down.

This compression of the chambers 24' and 26 helps to drive the oil present in these chambers towards the lines 28 and 28', in the direction of the arrows G and G' respectively. The presence of the means for controlling the flow of the fluid 36 and 40 makes it possible to adjust, by means of the valves 36A and 40A, the pressure difference existing between the chamber 24' and the intermediate point 29 on the one hand and the chamber 26 and the intermediate point 29' on the other hand. This makes it possible to modulate the restoring force exerted on the pistons 18 and 18' during their displacement caused by the transverse movement of the housing relative to the bogies.

Given that we are considering the case of strict transverse movement of the housing relative to the bogie, the longitudinal displacement of the two pistons 18 and 18' is identical, so that the chamber 24' undergoes a reduction in volume equal to the corresponding increase in volume of the chamber 24. Similarly, the chamber 26 is subject to a reduction in volume corresponding to the increase in volume within the chamber 26'.

Thus, the entirety of the hydraulic fluid driven out from the compressed chambers 24' and 26 respectively is allowed into the let-down chambers 24 and 26' respectively. These fluid movements are represented by the arrows H and H'.

It should be noted that, because of the configuration of the non-return valves 34B and 42B, the flow of the fluid to the let-down chambers 24 and 26' takes place freely. This permits supercharging of the chambers and thus prevents the cavitation of the hydraulic fluid on its admission into these chambers.

Given that the entirety of the fluid evacuated from the compressed chambers 24' and 26 is admitted into the let-down chambers 24 and 26', the secondary lines 30 and 30' and the accumulators 32 and 32' all play no part.

The intensity of the damping effect imparted by the device according to the invention during transverse movements of the housing may be modified by adjusting the valves 36A and 40A arranged immediately downstream of the compressed chambers 24' and 26. The pressures in the accumulators 32 and 32' being unchanged, and the jacks being symmetrical, no transverse restoring force is transmitted to the housing. Only the transverse damping force, brought about by passage of the fluid in the valves 36A and 40A, is transmitted to the housing. The system thus behaves like a transverse damping device.

Similar phenomena naturally arise in the case of a transverse displacement in the opposite direction (downwards in FIG. 2) of the housing 4.

Figure 4:
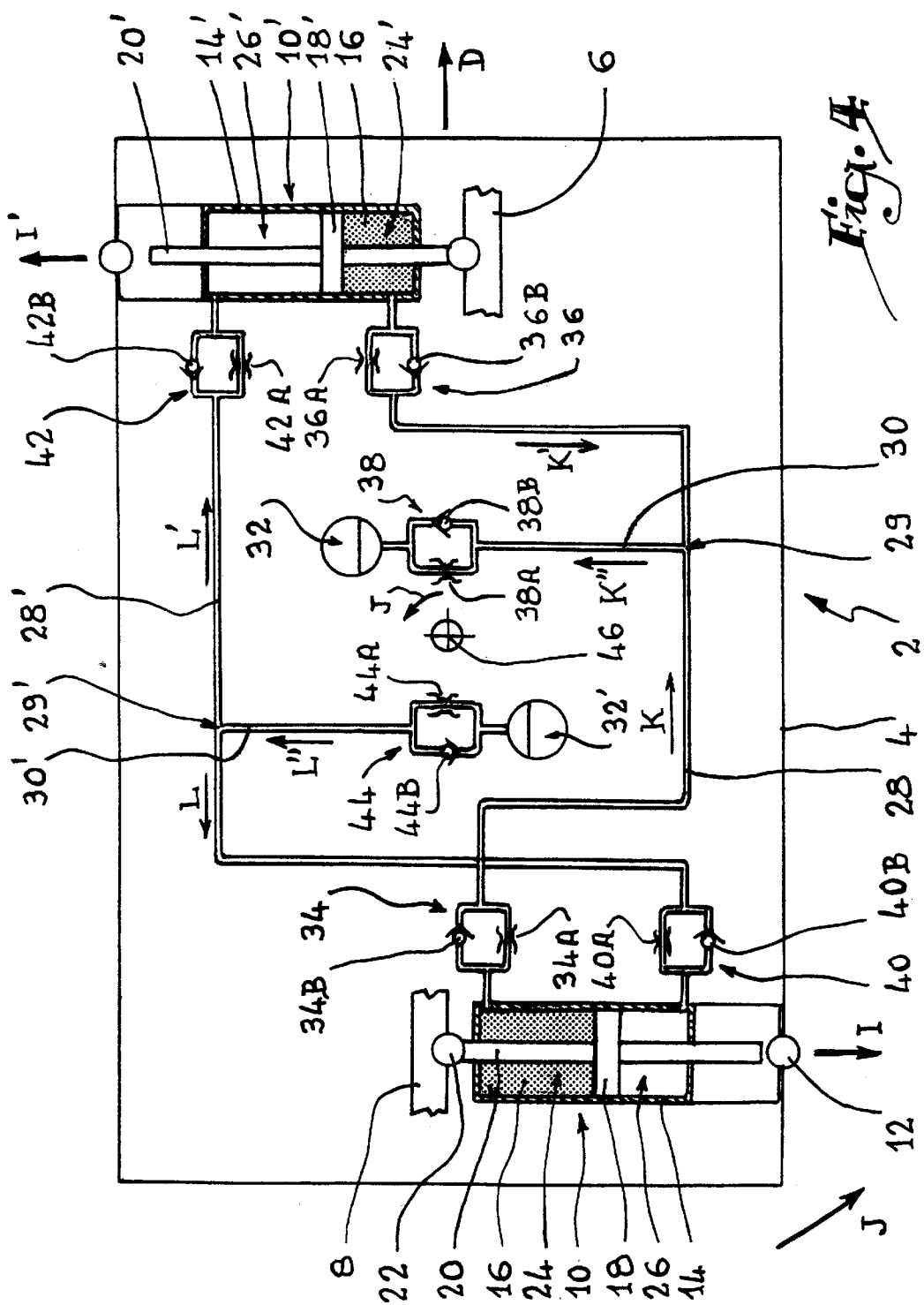
FIG. 4 is a view similar to FIG. 1, illustrating the device according to FIG. 1 in its position for damping the hunting movements of the housing of the vehicle.

FIG. 4 shows the operation of the device according to the invention during hunting movements of the housing 4. Such movements bring about global pivoting of the housing 4 about the point 46 or hunting axis. This pivoting, represented by the arrow J in this FIG. 3, is caused by a displacement of the housing 4 both relative to the rear bogie 8, in the direction of the arrow I, and relative to the front bogie 6, in the direction of the arrow I'. These movements thus take place in opposite directions.

These hunting movements result in compression of the chambers 24 and 24' of the jacks 10 and 10'. The effect of this is to drive some of the fluid initially present in these chambers towards the line 28, in the direction of the intermediate point 29. This fluid, coming from the chambers 24 and 24', is then guided by the secondary line 30 towards the accumulator 32. The flow of the fluid from these compressed chambers 24, 24' to the accumulator 32 is regulated by the valves 34A, 36A, 38A associated, respectively, with the non-return valves 34B, 36B and 38B. This influx of fluid into the accumulator 32 tends to reduce the volume occupied by the inert gas and therefore to increase the pressure acting thereon.

The movement of the hydraulic fluid from the compressed chambers 24, 24' to the accumulator 32 is represented by the arrows K, K' and K".

Simultaneously, with the compression of the chambers 24 and 24', a let-down takes place within the chambers 26 and 26'. Given that the volume of these chambers 26 and 26' increases during these hunting movements of the housing, hydraulic fluid is directed from the accumulator 32' towards these let-down chambers. This flow is freely permitted because of the arrangement of the non-return valves 40A, 42A and 44A. This makes it possible to prevent cavitation within the fluid during its admission into these chambers 26 and 26'.

Given that the volume of fluid in the accumulator 32' undergoes a reduction relative to the position of rest shown in FIG. 2, the volume of inert gas is subject to a corresponding increase, which helps to reduce the pressure prevailing within this gas.

The movement of the hydraulic fluid from the accumulator 32' to the let-down chambers 26, 26' is represented by the arrows L, L' and L".

The changes in internal pressure undergone by the inert gas contained, respectively, in the accumulators 32 and 32' help to generate a restoring torque acting against the angular hunting movement.

Specifically, apart from the losses of charge brought about by the valves and non-return valves, the pressure in the chamber 24 is substantially the reduced pressure of the accumulator 32', the pressure in the chamber 26 is substantially the increased pressure of the accumulator 32. The difference in pressures between the chambers 24 and 26 brings about, via the cross section of the piston 18, a transverse action by the jack on the housing, applied at 12 and opposite to the movement I.

By virtue of the symmetry of the device, a transverse force of the same intensity, but opposite to the movement I', is applied to the housing at 12'.

These two transverse forces being opposed, the resultant on the housing is zero, and by contrast a restoring torque opposing the annular hunting movement J is exerted. The device thus provides an anti-hunting angular rigidity function.

The losses of charge brought about by the adjustment valves 34A and 38A, and the valves 42A and 44A, generate a damping torque on the housing for the same reasons.

The hunting damping may be modulated by acting on the valves 38A and 44A. It is therefore to be noted that this damping component may be regulated independently of that intended to damp the transverse movements of the housing.

The invention makes it possible to achieve the objectives set out above. The device according to the invention provides reliable damping of both transverse and hunting movements of the housing relative to the bogies. Furthermore, by virtue of the invention, this dual damping is achieved through the agency of a single device, which must be compared with the prior art, in which it was necessary to provide a device for each bogie in order merely to achieve damping of the transverse movements.

The two types of damping imparted by the device according to the invention are adjustable, in respect of their intensity, because of the presence of the various valves associated with the corresponding non-return valves. Furthermore, these two damping components may be adjustable irrespective of one another by acting on the corresponding valves.

As a result of the configuration of the non-return valves interposed between the accumulators and the chambers, cavitation within the hydraulic fluid admitted into these chambers is avoided to a large extent.

Furthermore, the device according to the invention may be piloted. If the valves which it employs can be passive components, such as valves having a progressive opening as a function of differential pressure, they may likewise be piloted externally in order actively to control the passage cross section.

What is claimed is:

1. A damping device intended to be mounted on a vehicle 12, comprising a housing (4) resting on first (6) and second (8) support members arranged at a longitudinal distance apart from one another, the housing being capable of displacement relative to the support members (6, 8) in accordance with a transverse movement and a pivoting movement about a point (46) situated substantially on a medium longitudinal axis of the vehicle (2) and between the support members, said device comprising:

first (10) and second (10') symmetrical jacks, extending respectively between each support member (8, 6) and the housing (4), each jack (10, 10') defining first (24, 24') and second (26, 26') chambers filled with a hydraulic fluid (16, 16') capable of being, respectively, compressed and let down during variations in the transverse distance between the housing (4) and each support member (6, 8), a first (28) hydraulic line establishing fluid communication between the first chambers (24, 24') of the first (10) and second (10') jacks, and a second hydraulic line (28') establishing fluid communication between the second chambers (26, 26') of the first (10) and second (10') jacks, said first (28) and second (28') lines respectively possessing first (29) and second (29') intermediate points from which extend first (30) and second (30') branch lines opening, opposite the intermediate points, into first (32) and second (32') accumulators containing a compressed gas, first to fourth means (34, 35, 40, 42) for controlling the flow of the hydraulic fluid, arranged between each of the chambers (24, 24', 26, 26') and one of the intermediate points (29, 29') and capable of providing a controlled flow rate of the fluid from the chambers to the intermediate points, and fifth and sixth means (38, 44) for controlling the flow of the hydraulic fluid, arranged between each of the intermediate points (29, 29') and the corresponding accumulator (32, 32') and capable of providing a controlled flow rate of the fluid from the intermediate points to the accumulators, the chambers (24, 24', 26, 26') between which communication is established by each of the two lines (28, 28') being respectively let down and compressed during a first type of movement between the support members (6, 8) and the housing (4), so that substantially all of the fluid driven from each compressed chamber (24', 26) penetrates into the let-down chamber (24, 26') with which it communicates, generally without any variation in the volume of fluid in the accumulators (32, 32'), and the chambers (24, 24') communicating via one (28) of the lines both being compressed during a second type of movement between the support members (6, 8) and the housing (4), so as to direct the fluid driven from these two compressed chambers (24, 24') to one of the accumulators (32) and to increase the pressure of the gas contained therein, while the chambers (26, 26') communicating via the other (28') of the lines are both let down, so as to direct to these two let-down chambers (26, 26') part of the fluid present in the other accumulator (32') and to reduce the pressure of the gas contained therein.

2. Damping device according to claim 1, characterized in that the first to fourth means (34, 36, 40, 42) for controlling the flow of the fluid are capable of providing a free flow of fluid from the intermediate points (29, 29') to the said chambers (24, 24', 26, 26').

3. Damping device according to claim 1, characterized in that the fifth and sixth means (38, 44) for controlling the flow of the fluid are capable of providing a free flow of the fluid from the accumulators (32, 32') to the intermediate points (29, 29').

4. Damping device according to claim 1, characterized in that the said means (34, 36, 38, 40, 42, 44) for controlling the flow of the fluid comprise a non-return valve (34B, 36B, 38B, 40B, 42B, 44B) mounted in parallel with a valve (34A, 36A, 38A, 40A, 42A, 44A).

5. Damping device according to claim 1, characterized in that each of the said jacks (10, 10') comprises a seating (14, 14') solidly fixed to the housing (4) or to one of the support members (6, 8), in which seating a piston (18, 18') whose rod (20, 20') is solidly fixed to one of members or to the housing is able to move, the said rod extending longitudinally over the entirety of the seating.

6. Damping device according to claim 1, characterized in that a first jack (10) extends from a first transverse end of the housing (4), while the other jack (10') extends from the transverse end of the housing (4) opposite to the said first end.

7. A vehicle comprising a housing resting on two support members (6, 8) disposed longitudinally at a distance from one another, characterized in that the vehicle is equipped with a damping device according to claim 1.

8. The vehicle according to claim 7, wherein said vehicle is a rail vehicle.

9. The vehicle according to claim 7, wherein said two support members are two bogies.

* * * * *